US012481482B1

(12) United States Patent
Thirunavukkarasu et al.

(10) Patent No.: US 12,481,482 B1
(45) Date of Patent: Nov. 25, 2025

(54) VISUAL WORKFLOW FOR BUILDING CUSTOM DATA CONNECTORS

(71) Applicant: Eightfold AI Inc., Santa Clara, CA (US)

(72) Inventors: Thiyagaraj Thirunavukkarasu, Karnataka (IN); Avijit Agrawal, Uttar Pradesh (IN); Pavan Thakare, Karnataka (IN)

(73) Assignee: Eightfold AI Inc., Santa Clara, CA (US)

( * ) Notice: Subject to any disclaimer, the term of this patent is extended or adjusted under 35 U.S.C. 154(b) by 402 days.

(21) Appl. No.: 18/084,197

(22) Filed: Dec. 19, 2022

Related U.S. Application Data

(60) Provisional application No. 63/425,545, filed on Nov. 15, 2022.

(51) Int. Cl.
*G06F 8/34* (2018.01)
*G06Q 10/0631* (2023.01)

(52) U.S. Cl.
CPC ......... *G06F 8/34* (2013.01); *G06Q 10/06313* (2013.01)

(58) Field of Classification Search
CPC ............................ G06F 8/34; G06Q 10/06313
USPC .................................................. 717/100–113
See application file for complete search history.

(56) References Cited

U.S. PATENT DOCUMENTS

| 8,170,901 | B2 * | 5/2012 | Shukla | G06Q 10/0633 |
| | | | | 705/7.12 |
| 8,417,682 | B2 * | 4/2013 | Wilcox | G06Q 40/02 |
| | | | | 707/705 |
| 8,660,881 | B2 * | 2/2014 | Wood | G06Q 10/06316 |
| | | | | 705/7.26 |
| 10,521,195 | B1 * | 12/2019 | Swope | G06F 9/54 |
| 10,528,327 | B2 * | 1/2020 | Kumar | G06F 8/10 |
| 10,581,881 | B2 * | 3/2020 | Muddu | H04L 43/062 |
| 11,100,075 | B2 * | 8/2021 | Maloy | G06F 16/2272 |
| 11,704,098 | B2 * | 7/2023 | Scolnick | G06F 8/34 |
| | | | | 715/763 |
| 12,158,894 | B2 * | 12/2024 | Blonski | G06N 20/20 |
| 2020/0007615 | A1 * | 1/2020 | Brebner | G06F 9/542 |
| 2022/0107923 | A1 * | 4/2022 | Chittiprolu | G06F 16/212 |

* cited by examiner

*Primary Examiner* — Ted T. Vo
(74) *Attorney, Agent, or Firm* — Zhong Law, LLC

(57) ABSTRACT

One or more data objects from at least one of HR data system may each contain data fields storing HR information. A graphical user interface (GUI) may present primitive coding blocks representing standard graphic programming functions and custom business blocks representing high-level operations customly directed to the one or more data objects. A visual workflow may be constructed using at least one block selected, by a user of the GUI, wherein the at least one block represents operations linking the data fields of the one or more data objects to corresponding input fields of the at least one block. The at least one block of the visual workflow may be translated into a custom data connector comprising executable instructions for obtaining values for the corresponding input fields from the linked data fields and generating, based on the values, at least one corresponding data object storing the HR information.

20 Claims, 6 Drawing Sheets

500

```
┌─────────────────────────────────────────────────────────┐
│ IDENTIFYING ONE OR MORE DATA OBJECTS OBTAINED FROM AT   │── 502
│ LEAST ONE OF THE HR DATA SYSTEMS, WHEREIN EACH OF THE   │
│ DATA OBJECTS CONTAINS DATA FIELDS STORING HR INFORMATION│
└─────────────────────────────────────────────────────────┘
                            │
                            ▼
┌─────────────────────────────────────────────────────────┐
│ PRESENTING, IN A GRAPHICAL USER INTERFACE (GUI), PRIMITIVE│── 504
│ CODING BLOCKS, WHEREIN EACH OF THE PRIMITIVE CODING BLOCKS│
│ REPRESENTS A RESPECTIVE FUNCTION THAT IS PROVIDED IN A  │
│ STANDARD LIBRARY OF A GRAPHIC PROGRAMMING ENVIRONMENT   │
└─────────────────────────────────────────────────────────┘
                            │
                            ▼
┌─────────────────────────────────────────────────────────┐
│ PRESENTING, IN THE GUI, CUSTOM BUSINESS BLOCKS,         │── 506
│ WHEREIN EACH OF THE CUSTOM BUSINESS BLOCKS              │
│ REPRESENTS A RESPECTIVE HIGH-LEVEL OPERATION            │
│ CUSTOMLY DIRECTED TO THE ONE OR MORE DATA OBJECTS       │
│ IN OPERATION WITH AT LEAST ONE OF THE HR DATA SYSTEMS   │
└─────────────────────────────────────────────────────────┘
                            │
                            ▼
┌─────────────────────────────────────────────────────────┐
│ CONSTRUCTING A VISUAL WORKFLOW USING AT LEAST ONE       │── 508
│ BLOCK SELECTED, BY A USER USING THE GUI, FROM THE PRIMITIVE│
│ CODING BLOCKS AND THE CUSTOM BUSINESS BLOCKS, WHEREIN   │
│ THE AT LEAST ONE BLOCK REPRESENTS OPERATIONS LINKING    │
│ THE DATA FIELDS OF THE ONE OR MORE DATA OBJECTS TO      │
│ CORRESPONDING INPUT FIELDS OF THE AT LEAST ONE BLOCK    │
└─────────────────────────────────────────────────────────┘
                            │
                            ▼
┌─────────────────────────────────────────────────────────┐
│ EXECUTING A TRANSLATOR TO TRANSLATE THE AT LEAST ONE    │── 510
│ BLOCK OF THE VISUAL WORKFLOW INTO A CUSTOM DATA         │
│ CONNECTOR COMPRISING EXECUTABLE INSTRUCTIONS            │
└─────────────────────────────────────────────────────────┘
                            │
                            ▼
┌─────────────────────────────────────────────────────────┐
│ EXECUTING THE CUSTOM DATA CONNECTOR TO OBTAIN VALUES    │── 512
│ FOR THE CORRESPONDING INPUT FIELDS OF THE AT LEAST ONE  │
│ BLOCK FROM THE LINKED DATA FIELDS OF THE ONE OR MORE DATA│
│ OBJECTS AND GENERATE, BASED ON THE VALUES, AT LEAST ONE │
│ CORRESPONDING DATA OBJECT STORING THE HR INFORMATION    │
└─────────────────────────────────────────────────────────┘
```

*FIG. 5*

VISUAL WORKFLOW FOR BUILDING CUSTOM DATA CONNECTORS

CROSS-REFERENCE TO RELATED APPLICATION

This disclosure claims the benefit of U.S. provisional patent application 63/425,545 filed on Nov. 15, 2022.

TECHNICAL FIELD

The present disclosure relates to data connections between multiple data storage systems, and in particular to systems and methods for implementing a customizable visual workflow for constructing custom data connectors that process data objects ingested from human resource (HR) data systems.

BACKGROUND

An organization, such as a company, may need to hire people in the job market to fill job openings. The organization may use multiple HR data systems to assist the process of hiring candidates and also to help manage employees. The HR data systems may include systems for recruiting, applicant tracking, and employee management. For example, a business management software platform may ingest positions/jobs data from multiple ATS (Application Tracking Systems) and HRIS (Human Resources Information Systems) to create/manage hiring pipelines (e.g., by using a deep learning AI). These systems may contain desired HR data that may be exposed to other systems via APIs and/or XML data feeds. These APIs and/or XML data feeds may include a defined data structure that may specify features and feature values in the HR data. These documented data sources enable business management software platforms to build specific data connectors for these data sources. These specific data connectors allow the business management software platforms to extract and use data from existing HR data systems. This may be especially true for large enterprises which invest in ATS or HRIS technologies to manage their operations. However, smaller companies may not have a standard ATS or HRIS, and building a customized data connector for the smaller company may not be feasible even when the data may be stored in simple data formats like comma-separated values (CSV) or Microsoft Excel (e.g., spreadsheet format).

For example, a business management software platform may operate to create a workforce exchange that efficiently matches job seekers with employers at different scales. This workforce exchange may be primarily used, for example, by state governments in support of public policies that accelerate the re-employment of citizens. There may be many smaller employers/hiring companies that wish to engage with such a workforce exchange but, because these employers/hiring companies are smaller-scale, they may not have systems like ATS and HRIS to ingest data from such a workforce exchange. Therefore, there may be a need for custom data connectors to allow for the ingestion of job feed data (e.g., HR information) from data files that hiring companies share or host, for example on a secure file transfer protocol (SFTP) server.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 illustrates a flowchart of a method for implementing a customizable visual workflow for constructing custom data connectors that process data objects ingested from the HR data systems, according to an implementation of the present disclosure.

DETAILED DESCRIPTION

Figure 1:
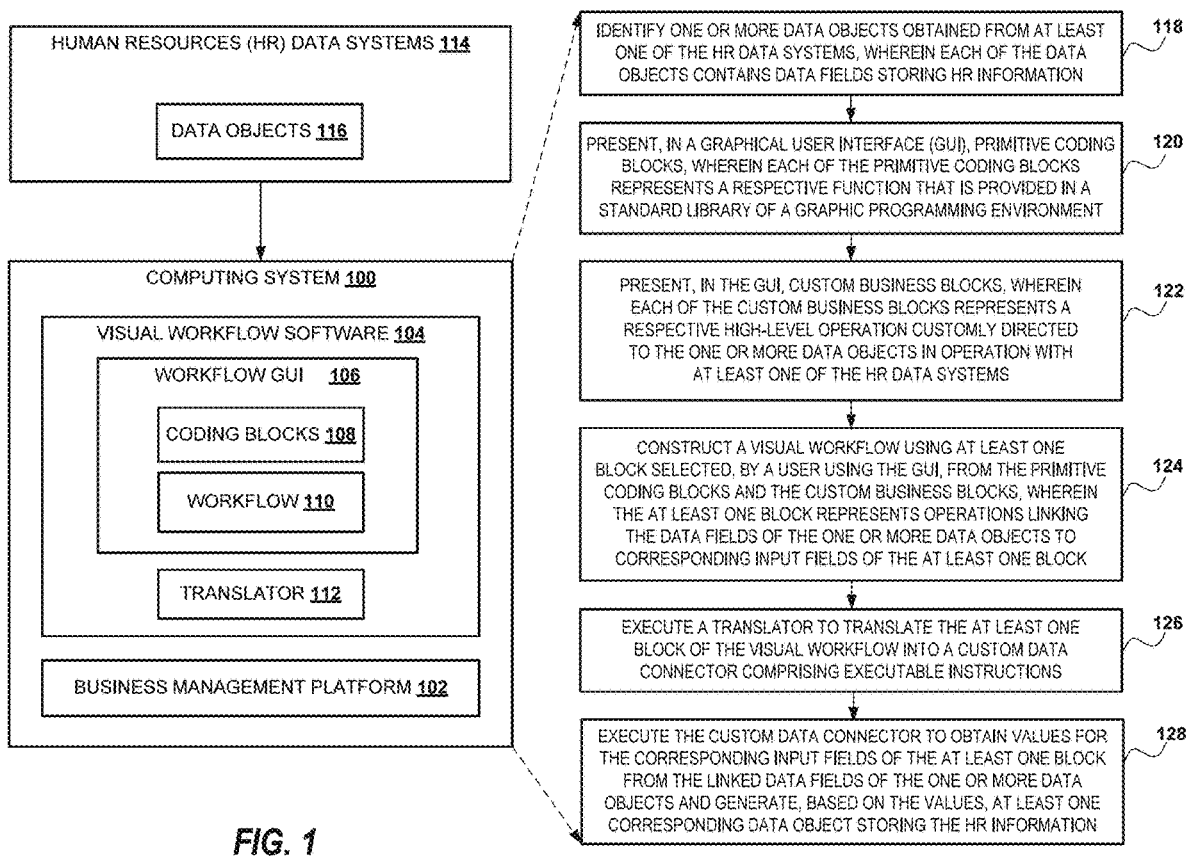
FIG. 1 illustrates a computing system implementing a customizable visual workflow for constructing custom data connectors that process data objects ingested from human resource (HR) data systems, according to an implementation of the present disclosure.

A business management software platform deployed by an organization may use a specific data system of data objects to store HR data relating to the candidates, jobs, and employees. Correspondingly, a remote HR data system may store copies of remote HR data that are related to the HR data stored in the business management software platform. The remote HR data may be stored in the form of remote data objects in a database of the remote HR data system. The remote data objects may be data entries in the database, the data entries including descriptions of job positions in the ATS, candidates for these job positions which could be inside or outside the organization, and candidates' application files. The remote data objects stored in the remote HR data system used by the organization and the data objects in the business management software platform may be connected (e.g., via a custom data connector) in order to update the HR data in the business management software platform and/or in the remote HR data system from time to time. For example, a custom data connector may include mappings between custom fields (e.g., of a data object and a remote data object) that are related but may be stored in the different data formats of the different data objects. Implementations may provide a data transformation macros library, where a macro refers to a single instruction that expands automatically into a set of instructions, to perform the mapping or transformation from a first custom field of a first data object to a second custom field of a second remote data object.

Custom data connectors may be implemented via workflow automations that may be built using several different approaches in different types of business management software platforms. A connector in this disclosure refers to an executable program that when executed may perform transfer of control and data from a first data source (e.g., a first database) to a second data source (e.g., a second database). Some of the data sources may be equipped with standard data connectors for data communication between two standard data sources. When there are no pre-installed connector for data communication between two data sources, a custom data connector may need to be constructed for such purpose. For example, software platform vendor services may include a closed software platform owned by a vendor that offers services, to its users, for building custom applications to execute their specific workflows. Building these custom applications may require programmers of the platform vendor to write code to create these user-specific business workflows. These custom applications, which execute over the software platform, may be expensive and time-consuming for the user as well as being difficult to alter, even slightly, since the user may be dependent on the vendor's programmers to make any changes.

Open software platforms may expose their application programming interfaces (APIs) so that programmers may build applications using the open software platform. A user programmer may write computer code using these APIs to achieve their user-specific business workflow. However, these custom applications may require skilled programmers that can understand the open software platform APIs and build a custom application to execute the user-specific business workflow. Furthermore, because these custom applications executing the workflow are built outside the software platform, it can be too expensive to deploy and maintain.

Other software platforms may offer standard business workflows as a feature so that users may define workflows using pre-specified configurations defined by a schema or via a graphical interface that represents the configuration. These pre-specified configurations may offer some level of flexibility in how a user-specific workflow can be defined on the basis of user-specific business needs. However, these pre-specified configuration usually cover well-recognized general-purpose business workflows and usually allow only high-level business operations. Therefore, it may be difficult to build a highly customized user-specific workflow that implements any of the low-level idiosyncrasies of the user-specific workflow.

In order to address the above-identified technical problems, the present disclosure provides a customizable visual workflow for building custom data connectors to ingest job feed data from files in a remote HR data system, without requiring the user to have in-depth knowledge of the remote HR data system or to write program code. A visual workflow may include graphical representations (e.g., graphically rendered blocks) of computer instructions that are executable by the business management software platform when they are interconnected to form the underlying executable workflow. The visual workflow allows a user to create custom workflows by dragging-and-dropping graphical blocks that could be, for example, those of Blockly (a graphical programming platform supplied by a third-party vendor). The customizable visual workflow may include a graphical user interface (GUI) that provides a suite of graphically rendered blocks for constructing a visual workflow, thereby generating the underlying program. These blocks may be interconnected based on the complementary shapes such as the matches between protrusion shape elements and recesses shape elements, where the complements between two blocks represent the compatibility of two instructions underlying the two blocks (i.e., the compatibilities of their two APIs). Thus, the drag-and-drop by a user may arrange (e.g., their complimentary shapes may be matched or connected by the user) the blocks to form a visual workflow to graphically construct a custom data connector to obtain values for a local data object from a remote data object (e.g., job feed data). After the creation of these visual workflows, they may be executed via a computer agent (e.g., cloud based) using a workflow manager as described below.

FIG. 1 illustrates a computing system 100 implementing a customizable visual workflow 110 for constructing custom data connectors that process data objects ingested 116 from human resource (HR) data systems 114, according to an implementation of the present disclosure.

As discussed above, an enterprise (e.g., a large company with a large number of employees and job candidates applying for job openings) may use a business management software platform 102 to manage human resources (candidates and/or employees). Enterprise computing system 100 may be a computing system including computer processors and storage devices. Alternatively, enterprise computing system 100 may be implemented in a computing cloud such as a public cloud, a private cloud, or a hybrid cloud. The business management software platform 102 may employ a suite of software applications running on enterprise computing system 100. The suite of software applications may include machine learning or neural network modules that may provide valuable insights into the HR data, the valuable insights including, but not limited to, quantitative metrics or the matching scores to match candidates and positions, highlights on candidate profiles, diversity analytics for diversity hiring goals, organization-wide skill and capability analytics for workforce planning, and HR analytics for recruiting operational excellence.

Business management software platform 102 may acquire the HR data from remote HR data systems 114 which may be standard systems that provide different types of HR data. Examples of standard systems may include Applicant Tracking System (ATS) and the Human Resource Information Systems (HRIS). These standard systems may have been purchased by the organization installed on premise of the organization. Alternatively, these standard systems may be subscribed by the organization in the form of software as a service (SaaS). Additionally, business management software platform 102 may obtain talent data from different vendors. For example, business management software platform 102 may obtain a first portion of the talent data from a first remote HR data systems 114 and obtain a second portion of the talent data from a second remote HR data systems 114. Business management software platform 102 may then update the HR data stored in the enterprise computing system 100. Correspondingly, remote HR data systems 114 may also be updated from time to time (e.g., talent profiles of new applicants are entered into the ATS).

The visual workflow software 104 may be an enterprise software application facilitating an organization to create custom business workflows (e.g., for creating custom data connectors). Computing system 100 may be a standalone computer or a networked computing resource implemented in a computing cloud. Computing system 100 may include one or more processing devices, storage devices, and interface devices (e.g., computer display, keyboard, mouse, etc.) where the storage devices and the interface devices are communicatively coupled to the processing devices.

The workflow GUI 106 of the visual workflow software 104 may provide two types of graphical coding blocks 108 to create a business workflow 110: primitive coding blocks and higher order custom blocks. The primitive coding blocks may correspond to basic computer programming instructions which may include logical, mathematical and data operations. These primitive blocks may be specified using extensible markup language (XML) which may be rendered graphically for the users of the visual workflow software 104. Each coding block 108 may be translated into low-level executable computer code. In contrast, the higher-order custom blocks may include predefined blocks that produce high-level instructions that can be executed over the business management software platform 102. These custom blocks export computer instructions that may interact with the business management software platform 102. In some implementations, the custom blocks may perform higher-level functions, such as, fetching a CSV file from an SFTP server, creating a position feed XML, initiating data ingestions, etc.

Both types of blocks may be inter-operable with each other provided their output/input interfaces are compatible (e.g., this may be indicated visually by complementary shapes for blocks that are programmatically compatible). In some implementations, the XML specifications may determine the data types for input fields and output fields of the coding blocks 108, the computer instructions associated with the coding blocks 108, and the graphical renditions for the coding blocks 108, wherein the shape of a block 108 is complementary to the shape of other blocks 108 (e.g., they fit together) that are compatible with the block 108 for visual workflow programming. In some implementations, each of the coding blocks 108 may be associated with a unique identifier used to address the coding blocks 108 by components of the visual workflow software platform 104 as described more fully below with respect to FIG. 2.

To build the custom data connectors, the coding blocks 108 may be used to perform one-to-one mappings, aggregations, and data transformations according to the requirements of the data connection. For example, the name of an employee (e.g., an input field of a local data object) may be derived by joining the values of two columns of a CSV file (e.g., two output fields of a remote data object). In other words, the coding blocks 108 may be used to perform string concatenation. This may involve both types of coding blocks 108: primitive blocks for string operations and higher-order custom business blocks for creating a new field in a job feed and iterating data over a CSV file.

Computing system 100 may be communicatively connected to one or more remote HR data systems 114. These remote HR data systems 114 may include one or more human resource management (HRM) systems that are associated with the same or different organizations. The HRM systems can track external/internal candidate information in a pre-hiring phase (e.g., using an applicant track system (ATS)), or track employee information after they are hired (e.g., using an HR information system (HRIS)). Thus, these HR data systems 114 may include files (e.g., remote data objects 116) that contain HR information relating to job openings, candidates for these job openings, and current employees associated with the organization or other organizations. In some implementations, the HR data systems 114 may comprise at least one file server (e.g., an SFTP server) and the one or more data objects 116 may comprise at least one comma-separated values (CSV) file associated with a job feed.

The following sections describe the operation of visual workflow software 104 (in conjunction with business management platform 102 and HR data systems 114) in more detail through the flow diagram steps 118-128.

Referring to FIG. 1, at 118, computing system 100 may identify one or more data objects 116 obtained from at least one of the HR data systems 114, wherein each of the data objects 116 contains data fields storing HR information. As noted above, HR data systems 114 may include files (e.g., remote data objects 116) that contain HR information relating to job openings, candidates for these job openings, and current employees associated with the organization or other organizations.

At 120, computing system 100 may present, in a graphical user interface (e.g., workflow GUI 106), primitive coding blocks (e.g., part of coding blocks 108), wherein each of the primitive coding blocks represents a respective programming function that is provided in a standard library of a graphic programming environment (e.g., visual workflow software 104). As noted above, the primitive coding blocks may represent basic computer programming instructions such as instructions for logical, mathematical and simple data operations.

At 122, computing system 100 may present, in the GUI, custom business blocks (e.g., part of coding blocks 108), wherein each of the custom business blocks represents a respective high-level operation customly directed to the one or more data objects 116 in operation with at least one of the HR data systems 114. As noted above, the custom coding blocks may represent high-level business instructions that may be executed over the business management software platform 102.

At 124, computing system 100 may construct a visual workflow 110 using at least one coding block 108 selected, by a user using the workflow GUI 108, from the primitive coding blocks and the custom business blocks, wherein the at least one coding block 108 represents operations linking the data fields of the one or more data objects 116 to corresponding input fields of the at least one coding block 108. For example, the data object 116 may be a CSV file and the data field may be a row of the CSV file that may be linked to an input field (e.g., candidate name) of a coding block 108 so that a "value" of the CSV row (e.g., text string "Anthony") may be copied to the linked input field of the coding block 108.

At 126, computing system 100 may execute a translator 112 to translate the at least one coding block 108 of the visual workflow 110 into a custom data connector comprising executable instructions (e.g., executable on business management platform 102) via a computer agent (e.g., computing system 100 and/or a cloud-based computer agent) as described more fully below with respect to FIG. 2.

At 128, computing system 100 may execute the custom data connector (e.g., on business management platform 102) to obtain values (e.g., HR information) for the corresponding input fields of the at least one coding block 108 from the linked data fields of the one or more data objects 116 and generate, based on the values, at least one corresponding data object (e.g., an XML feed) storing the HR information, from the linked data fields of the one or more data objects 116, in computing system 100. In some implementations, computing system 100 may generate an XML statement defining a storage call to the corresponding input fields of the at least one coding block 108 with respect to the linked data fields of the one or more data objects 116, and serialize the visual workflow 110 into an XML file based on the generated XML statement.

In some implementations, a first one of the coding blocks 108 (e.g., primitive or custom blocks) may contain a first input field and a second one of the coding blocks 108 may contain a second output field. Computing system 100 may receive, from a user through the workflow GUI 106, a selection of the first and second coding blocks 108 containing the first input field and the second output field and construct the visual workflow 110 using the first and second coding blocks 108. The first and second coding blocks 108 in this visual workflow 110 represent operations linking the first input field to the second output field. Computing system 100 may then execute the custom data connector (executable computer instructions associated with the coding blocks 108 of visual workflow 110) to obtain a value for the first input field from the linked second output field.

Figure 3:
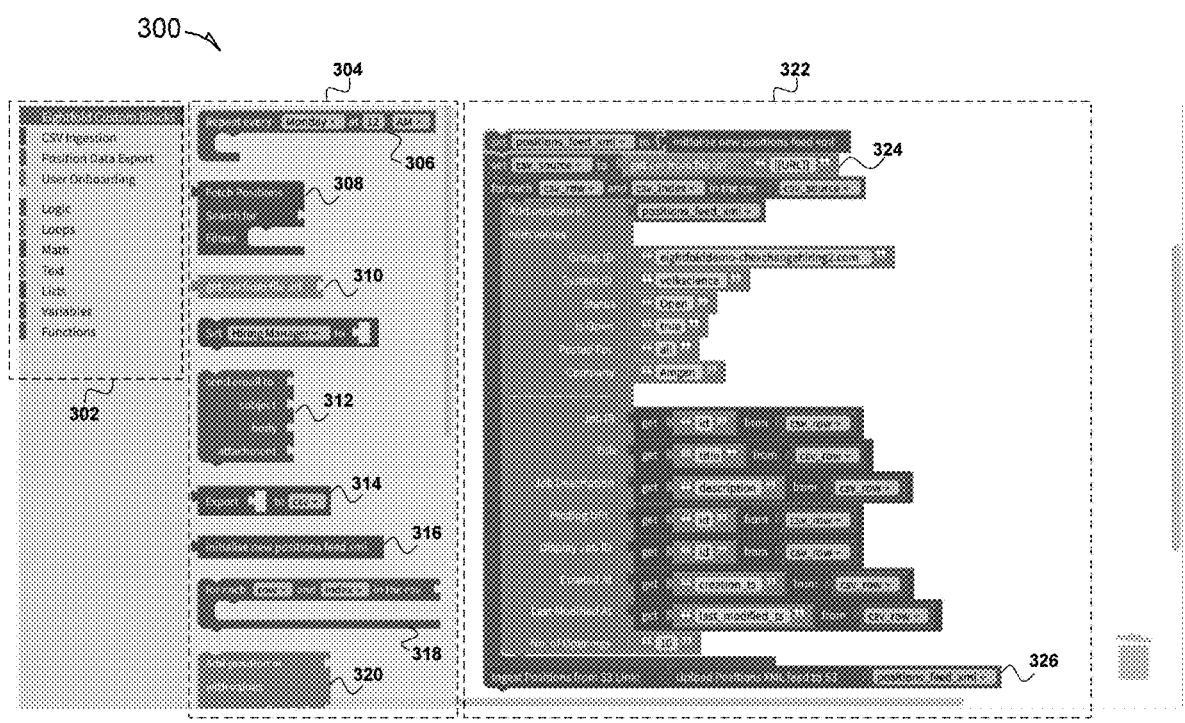
FIG. 3 illustrates a workflow graphical user interface (GUI) with custom programming blocks and a visual workflow for a custom data connector to ingest a CSV file from the HR data systems, according to implementations of the present disclosure.
Figure 4:
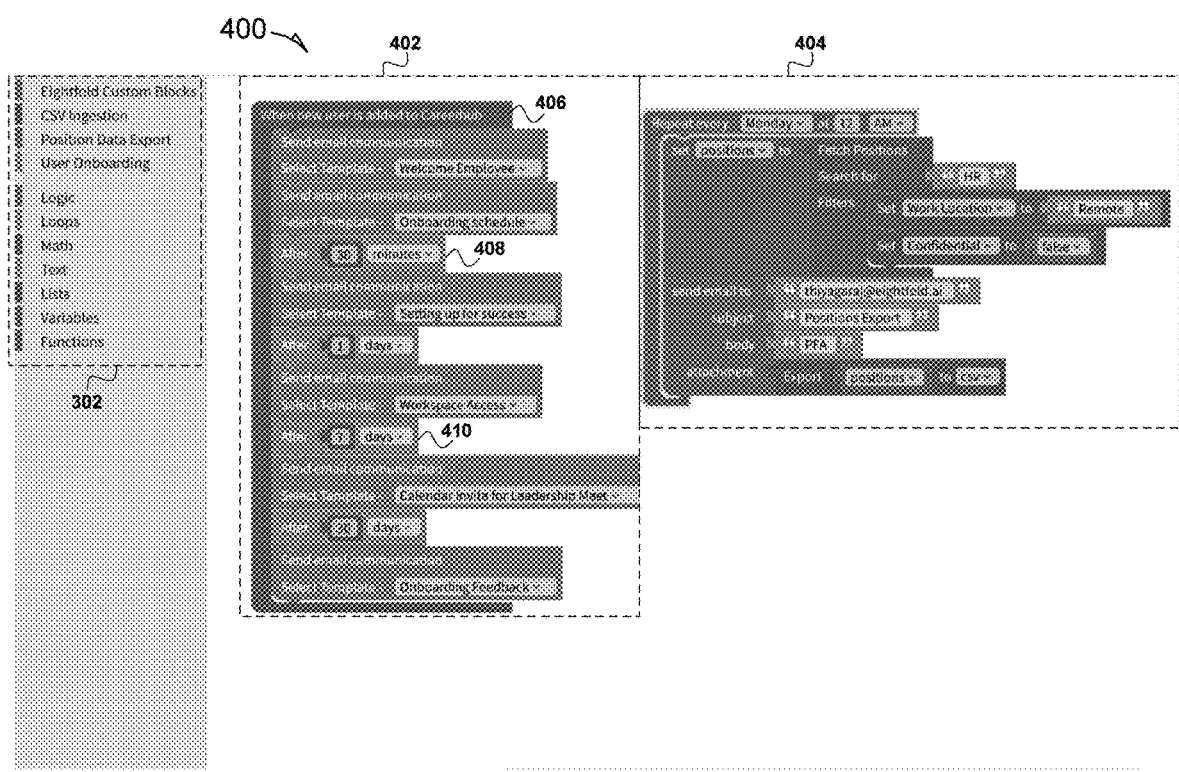
FIG. 4 illustrates a workflow GUI with visual workflows for adding new employees to the system and for exporting available positions data from the system respectively, according to some implementations of the present disclosure.

In some implementations, the first coding block 108 and the second coding block 108 may be graphically rendered (e.g., as specified by an XML definition of the coding block 108) in the workflow GUI 106 as respective first and second shapes that are complimentary to each other (e.g., they can be matched or connected to each other). Furthermore, the user input selecting the coding blocks 108 for the visual workflow 110 may include connecting the complimentary shapes of the selected coding blocks 108 to each other as shown with respect to the examples of the workflow GUI 106 as shown in FIG. 3 and FIG. 4 which are both described below.

Figure 2:
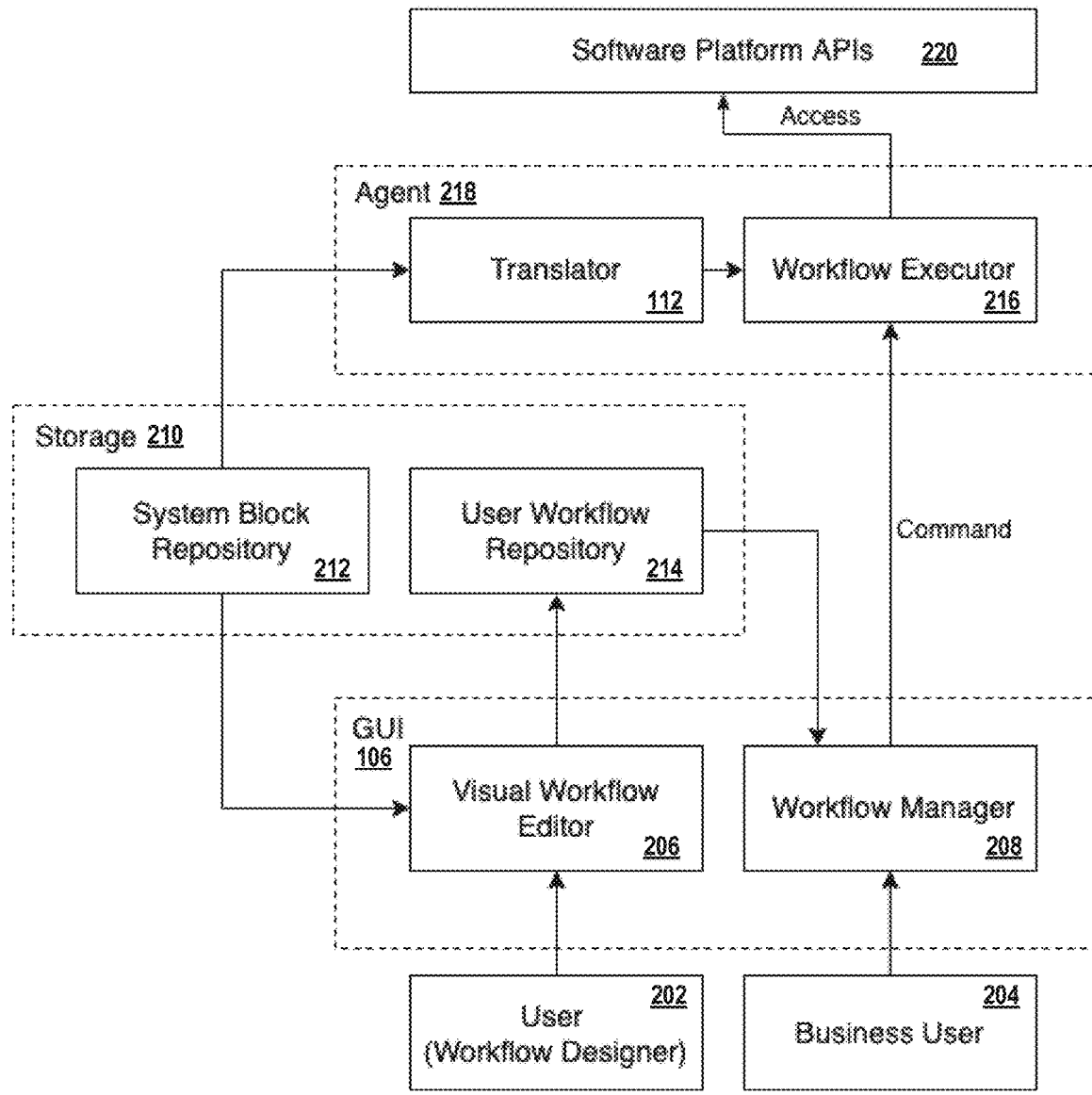
FIG. 2 illustrates components of a system for implementing a customizable visual workflow for constructing custom data connectors that process data objects ingested from the HR data systems, according to an implementation of the present disclosure.

FIG. 2 illustrates components of a system 200 for implementing a customizable visual workflow 110 for constructing custom data connectors that process data objects 116 ingested from the HR data systems 114, according to implementations of this disclosure.

The visual workflow 110 may be executed by a workflow executor 216. The workflow executor 216 may use the translator 112 to translate graphical blocks (e.g., coding blocks 108 of FIG. 1 stored in system block repository 212 of storage 210) into computer instructions that may be executed (e.g., by the computing system 100 of FIG. 1 or by a computer agent 218) to interact with a software platform (e.g., business management software platform 102 of FIG. 1) via software platform APIs 220. The visual workflow 110 may be executed immediately (e.g., via computing system 100 of FIG. 1) or scheduled to run periodically in the cloud by dedicated or shared computer agents 218, depending on the user-specific business needs. A visual workflow manager 208 may configure this execution schedule. The workflow manager 208 may help the user to view and/or execute the visual workflows 110 (e.g., in user workflow repository 214 of storage 210) via a workflow executer 216. To execute a visual workflow 110 a computer agent 218 (e.g., or computing system 100) may be assigned. The computer agent 218 may have access to a privileged execution environment that allows it to interact with the business management software platform 102 via the software platform APIs 220. The computer agent 218 may use the translator 112 to translate the visual workflow 110 into executable computer instructions. After successful translations of the coding blocks 108 of the visual workflow 110, the resulting computer instructions may be executed (e.g., by at least one computer agent 218).

Referring to FIG. 2, there may be two types of users of the visual workflow software 104: workflow designers 202 and business users 204. A workflow designer 202 may create visual workflows 110 using a visual workflow editor 206. The workflow designers 202 may use the workflow editor 206 via GUI 106 to create visual workflows 110 that may automate business processes. For example, creating a position/job feed (e.g., XML) using a CSV file stored at an SFTP server with a custom data connector. The workflow designers 202 may save these visual workflows 110 in a user workflow repository 214 where these visual workflows 110 may be serialized as XML files. Accordingly, each XML file in the user workflow repository 214 may represent a visual workflow 110 created using the coding blocks 108. The business user 204 may access to all of the visual workflows 110 (e.g., in the user workflow repository 214) designed for achieving business outcomes. The business user may execute and/or schedule execution of these visual workflows 110 using the workflow manager 208. The workflow manager 208 may provide, via GUI 106, lists of all of the: available visual workflows 110 (e.g., in the user workflow repository 214), visual workflows 110 in execution, execution monitoring data, and/or execution history data.

The visual workflow editor 206 may, via GUI 106, allow users (e.g., 202 and 204) to explore all the coding blocks 108 available in a system block repository 212 of the visual workflow software 104. The coding blocks 108 may be rendered using drag-and-drop graphical blocks specified via an XML definition. In some implementations, the coding blocks 108 may comprise the graphical blocks of Blockly (Google) or Scratch (MIT Media Lab). The visual workflow editor 206 may allow users to design, save and edit a visual workflow 110.

The workflow manager 208 may, via GUI 106, allow a business user 204 to browse through all the visual workflows 110 available in the user workflow repository 214. The business user 204 may use workflow manager 208 to assign computer agents 218 (e.g., in the cloud) to execute or schedule a visual workflow 110. As noted above, the workflow manager 208 may also display all visual workflows 110 that are in execution and may also relay related monitoring data.

The system block repository 212 stores all the graphical coding blocks 108 that may constitute a visual workflow 110 designed with the visual workflow editor 206 and stored in the user workflow repository 214. As noted above, each coding block 108 may be defined by an XML and may be associated with a unique identifier. This unique identifier allows the translator 112 to map the code bindings for each coding block 108 that is defined in the XML. Therefore, in order to create any new custom coding block 108, an XML definition may need to be added to the block repository 212.

The user workflow repository 214 may store all of the visual workflows 110 designed with the visual workflow editor 206 and stored in the user workflow repository 214. As noted above, each visual workflow 110 may be serialized into XML and stored in the user workflow repository 214. The stored XML definitions of the coding blocks 108 may then be de-serialized and rendered as graphical coding blocks 108 in the GUI 106 by the visual workflow editor 206.

The translator 112 may have access to the system block repository 212. This enables the translator 112 to use the mappings (e.g., between unique identifiers and executable computer instructions) to convert graphical coding blocks 108 into computer instructions that may be executed (e.g., via computer agent 218) to interact with the business management software platform 102 via the software platform APIs 220. Accordingly, the output of the translator 112 may comprise executable computer instructions for the computer agent 218 (e.g., computing system 100 of FIG. 1 or a cloud based computer agent to interact with the business management software platform 102).

The workflow executor 216 may be a program that orchestrates the execution of a visual workflow 110. As noted above, the visual workflow 110 may be executed on a computer agent 218 (e.g., cloud based) that provides a privileged environment for the visual workflow 110 to execute and interact with the business management software platform 102 via the software platform APIs 220. The workflow executor 216 may use the translator 112 to convert the visual workflow 110 into an instruction set that it may execute. In some implementations, the workflow executor 216 may relay execution based metadata and/or monitoring data to workflow manager 208.

An agent pool of computer agents 218 in the cloud (as well as computing system 100 of FIG. 1) may have access to a privileged execution environment allowing them to access the software platform APIs 220 that allow for performing business operations (e.g., workflows) on the business management software platform 102. The agent pool may be managed by the workflow manager 208. In some implementations new computer agents 218 may be added to the agent pool in order to increase the execution capacity managed by the workflow manager 208.

FIG. 3 illustrates a workflow GUI 300 with custom programming blocks 304 and a visual workflow 322 for a custom data connector to ingest at least one CSV file (e.g., data object 116 of FIG. 1) from the HR data systems 114, according to some implementations of the present disclosure.

Referring to FIG. 3, the workflow GUI 300 (e.g., an example of workflow GUI 106 of FIG. 1) includes a graphical programming blocks menu 302 (e.g., showing coding blocks 108 of FIG. 1) wherein the graphical programming blocks may include primitive coding blocks and higher order custom blocks. The primitive coding blocks may correspond to basic computer programming instructions which are shown to include: blocks for logic, loops, math, text, lists, variables and functions in menu 302. As noted above, each graphical programming block may be translated into low-level executable computer code. The higher-order custom blocks may be predefined blocks that produce high-level instructions that may be executed on a software platform, such as, the business management software platform 102 of FIG. 1. As shown in the graphical programming block menu 302, the custom blocks may perform higher-level functions, such as, CSV ingestion (e.g., fetching a CSV file from an SFTP server and creating a position feed XML), position data (e.g., job openings) export to remote system and new user (e.g., new employee) onboarding.

Both types of blocks (e.g., primitive and custom) may be inter-operable with each other provided their output/input interfaces are compatible and this may be indicated visually by complementary shapes, such as puzzle pieces that fit each other, for blocks that are programmatically compatible. Selecting the custom blocks in graphical programming blocks menu 302 will display the custom blocks menu 304 (e.g., as part of coding blocks 108 of FIG. 1). The custom block menu 304 displays the custom blocks (e.g., available in system block repository 212) for user selection to create a custom business workflow (e.g., workflow 110 of FIG. 1). For example, custom block 306 may allow the user to schedule (e.g., "repeat every") the execution of a workflow (e.g., with workflow manager 208). Custom block 308 may allow the user to search for job openings in the organization (e.g., over business management software platform 102 of FIG. 1) by using "search for" and "filters" to narrow the search. Custom block 310 may allow the user to ingest (e.g., "get") a CSV file (e.g., data object 116 of FIG. 1) from a remote location (e.g., HR data systems 114 of FIG. 1) defined by a unique identifier used to locate a resource on the Internet, e.g., a uniform resource locator (URL).

Custom block 312 may allow the user to send standard emails to a group of users (e.g., new employees in business management software platform 102 of FIG. 1) by using "subject", "body" and "attachments" to fill in the components of the email. Custom block 314 may allow the user to export locally stored HR information (e.g., stored in a local data object in XML format) to a remote system (HR data systems 114 of FIG. 1) to be stored information (e.g., stored in a local data object in CSV format). Custom block 316 may allow the user to initialize a new positions feed XML (e.g., a local data object), for example, based on HR information obtained from a CSV file at a remote HR data system like HR data systems 114 of FIG. 1. Custom block 318 may allow the user iterate a series of data connections between input fields of local data objects and corresponding rows and indexes of a CSV file (e.g., stored in a remote data system (HR data systems 114 of FIG. 1). Custom block 320 may allow the user to add standard positions in a positions feed XML (e.g., new job openings in business management software platform 102 of FIG. 1) by using a custom data connector workflow (e.g., workflow 322 described below) to obtain HR information from a CSV file at a remote HR data system to provide values for aspects of the available positions, such as a job "title" and/or "description".

In order to build the custom data connector, the custom graphical programming blocks 304 may be used to perform 1-1 mappings, aggregations, and data transformations according to the requirements of the data connection. For example, the "CSV ingestion" visual workflow 322 combines custom blocks 310, 316, 318 and 320 (among others) to obtain HR information from a CSV source by "getting" a CSV file from a URL specified by a primitive (e.g., text) coding block 324 (e.g., [[URL]]) and generating a positions feed XML based on the HR information from the CSV source (e.g., see graphical programming block 326 of visual workflow 322.

FIG. 4 illustrates a workflow GUI 400 with visual workflows 402 and 404 for adding new employees to the system (e.g., business management software platform 102 of FIG. 1) and for exporting available positions data from the system (e.g., to a remote HR data system 114 of FIG. 1) respectively, according to implementations of the present disclosure.

Referring to FIG. 4, the workflow GUI 400 (e.g., an example of workflow GUI 106 of FIG. 1) includes the graphical programming blocks menu 302 (e.g., showing coding blocks 108 of FIG. 1) wherein the graphical programming blocks may include primitive coding blocks and higher order custom blocks. As noted above, the primitive coding blocks may correspond to basic computer programming instructions which are shown to include: blocks for logic, loops, math, text, lists, variables and functions in menu 302. Also as noted above, the higher-order custom blocks may be predefined blocks that produce high-level instructions that may be executed on a software platform, such as, the business management software platform 102 of FIG. 1.

In order to build the visual workflow 402 (e.g., "user onboarding") for adding new employees to the system (e.g., business management software platform 102 of FIG. 1), the custom graphical programming block 312 may be used to send standard (e.g., template based) emails to a group of users (e.g., new employees in business management software platform 102 of FIG. 1) according to a schedule that is based on graphical programming block 406 "when new user is added to careerhub". For example, graphical programming block 408 provides for a "welcome employee" template email to be sent to new employees "after 30 minutes" have passed and graphical programming block 410 provides for a "workspace access" template email may be sent to the new employees "after 7 days" have passed.

In order to build the visual workflow 404 (e.g., "position data export") for exporting HR information relating to new job openings to a remote HR data system (e.g., HR data systems 114 of FIG. 1), the custom graphical programming blocks 306, 308, 312 and 314 may be combined to send an email with the positions data for export as a CSV format attachment every Monday at 12:00 am. For example, HR information regarding open positions with the "HR" department that have a "work location" of "remote" may be sent as an email attachment.

FIG. 5 illustrates a flowchart of a method 500 for implementing a customizable visual workflow 110 for constructing custom data connectors that process data objects 116 ingested from the HR data systems 114, according to an implementation of the present disclosure.

Method 500 may be performed by processing devices that may comprise hardware (e.g., circuitry, dedicated logic), computer readable instructions (e.g., run on a general purpose computer system or a dedicated machine), or a combination of both. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. It should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 5 the method 500 comprises, at 502, identifying one or more data objects (e.g., data objects 116 of FIG. 1) obtained from at least one HR data systems (e.g., HR data systems 114 of FIG. 1), wherein each of the data objects 116 contains data fields storing HR information. As noted above, HR data systems 114 may include files (e.g., remote data objects 116) that contain HR information.

At 504, presenting, in a graphical user interface (e.g., workflow GUI 106 of FIG. 1), primitive coding blocks (e.g., part of coding blocks 108 of FIG. 1), wherein each of the primitive coding blocks represents a respective programming function that is provided in a standard library of a graphic programming environment (e.g., visual workflow software 104 of FIG. 1). As noted above, the primitive coding blocks may represent basic computer programming instructions.

At 506, presenting, in the GUI 106, custom business blocks (e.g., part of coding blocks 108), wherein each of the custom business blocks represents a respective high-level operation customly directed to the one or more data objects 116 in operation with at least one of the HR data systems 114. As noted above, the custom coding blocks may represent high-level business instructions that may be executed on a software platform (e.g., business management software platform 102 of FIG. 1).

At 508, constructing a visual workflow 110 using at least one coding block 108 selected, by a user using the workflow GUI 108, from the primitive coding blocks and the custom business blocks, wherein the at least one coding block 108 represents operations linking the data fields of the one or more data objects 116 to corresponding input fields of the at least one coding block 108. For example, the data object 116 may be a CSV file and the data field may be a row of the CSV file that may be linked to an input field (e.g., candidate address) of a coding block 108 so that a "value" of the CSV row (e.g., text string "12 Main Street") may be copied to the linked input field of the coding block 108.

At 510, executing a translator 112 to translate the at least one coding block 108 of the visual workflow 110 into a custom data connector comprising executable instructions (e.g., executable on business management platform 102) via a computer agent (e.g., computing system 100 of FIG. 1 and/or a cloud-based computer agent 218 of FIG. 2) as described more fully above with respect to FIG. 1 and FIG. 2.

At 512, executing the custom data connector (e.g., on business management platform 102) to obtain values (e.g., HR information) for the corresponding input fields of the at least one coding block 108 from the linked data fields of the one or more data objects 116 and generate, based on the values, at least one corresponding data object (e.g., an XML feed) storing the HR information, from the linked data fields of the one or more data objects 116, in computing system 100.

Figure 6:
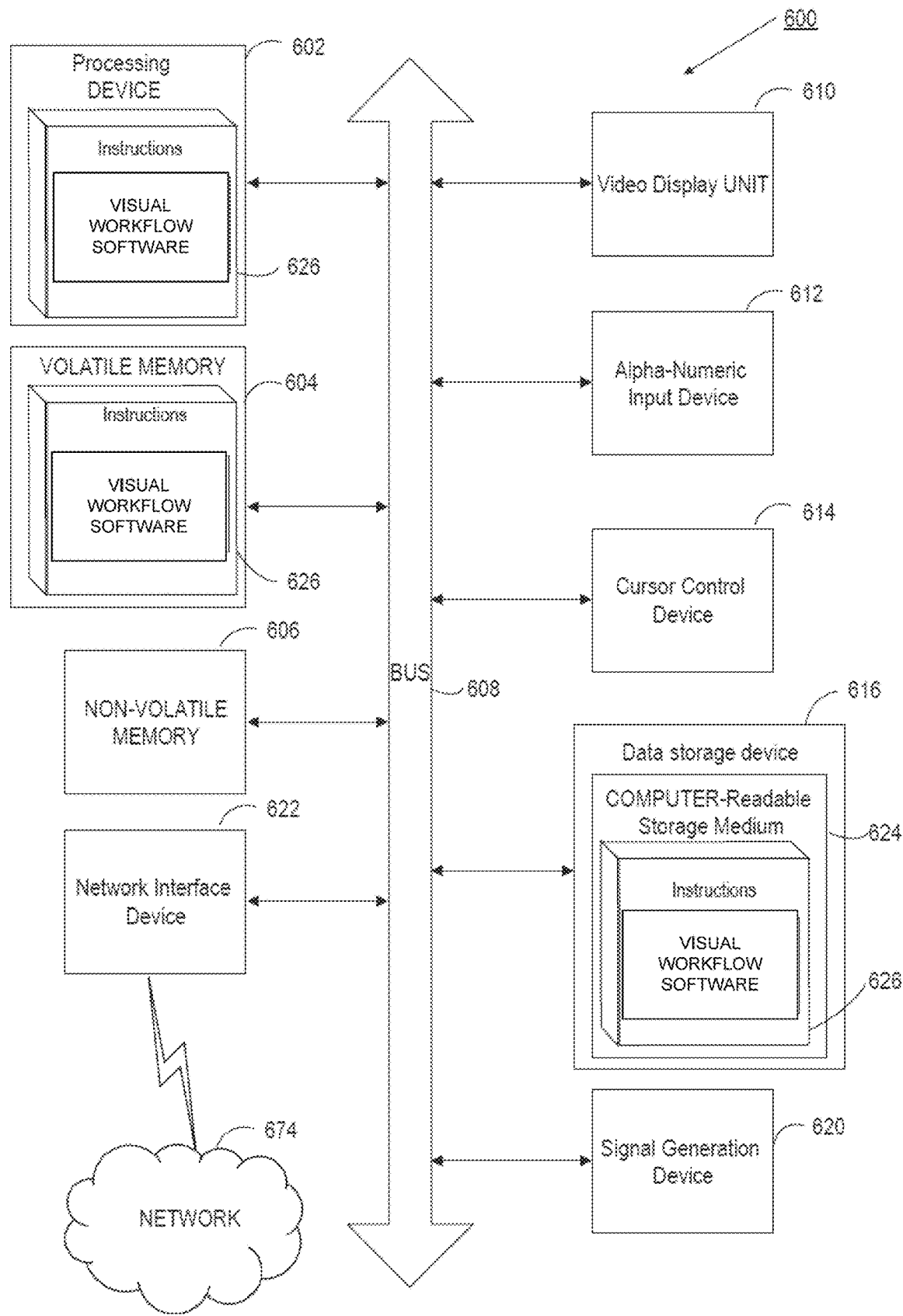
FIG. 6 depicts a block diagram of a computer system operating in accordance with one or more aspects of the present disclosure.

FIG. 6 depicts a block diagram of a computer system 600 operating in accordance with one or more aspects of the present disclosure. In various illustrative examples, computer system 600 may implement a customizable visual workflow 110 for constructing custom data connectors that process data objects 116 ingested from the HR data systems 114 as shown in FIG. 1.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein (e.g., method 500 of FIG. 5).

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC)

microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for providing visual workflow software 104 of FIG. 1.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described.

What is claimed is:

1. A system comprising one or more processing devices and one or more storage devices for storing instructions implementing a customizable visual workflow for constructing custom data connectors that process data objects ingested from human resource (HR) data systems, the one or more processing devices to:
    identify one or more data objects obtained from at least one of the HR data systems, wherein each of the data objects contains data fields storing HR information;
    present, in a graphical user interface (GUI), primitive coding blocks, wherein each of the primitive coding blocks is graphically represented by a corresponding geometric shape, and each of the primitive coding blocks represents a respective function that is provided in a standard library of a graphic programming environment;
    present, in the GUI, custom business blocks, wherein each of the custom business blocks is graphically represented by a corresponding geometric shape, each of the custom business blocks represents a respective high-level operation customly directed to the one or more data objects in operation with at least one of the HR data systems;
    construct a visual workflow using at least one block selected, by a user using the GUI, from the primitive coding blocks and the custom business blocks, wherein selection, by the user using the GUI, from the primitive coding blocks and the custom business blocks is based on a complementary match of geometric shapes between two connected consecutive blocks, wherein the at least one block represents operations linking the data fields of the one or more data objects from the at least one HR data systems without further human programming coding to corresponding input fields of the at least one block;
    execute a translator to translate the at least one block of the visual workflow into a custom data connector comprising executable instructions; and
    execute the custom data connector to obtain values for the corresponding input fields of the at least one block from the linked data fields of the one or more data objects; and generate, based on the values, at least one corresponding data object storing the HR information.

2. The system of claim 1, wherein the blocks are specified by extensible markup-language (XML) files that determine:
    data types for input fields and output fields of the blocks;
    computer instructions associated with the blocks; and graphical renditions for the blocks, wherein the shape of each block is complementary to the shape of other blocks that are compatible with the block for visual workflow programming.

3. The system of claim 2, wherein the one or more processors are further to:
   generate an extensible markup-language (XML) statement defining a storage call to the corresponding input fields of the at least one block with respect to the linked data fields of the one or more data objects, and
   serialize the visual workflow into XML based on the generated XML statement.

4. The system of claim 1, wherein the HR data systems comprise at least one secure file transfer protocol (SFTP) server, the one or more data objects comprise at least one comma-separated values (CSV) file, and the at least one corresponding data object comprises an XML file.

5. The system of claim 1, wherein a first one of the primitive coding blocks or the custom business blocks contains a first input field and a second one of the primitive coding blocks or the custom business blocks contains a second output field, the one or more processors further to:
   receive, from the user through the GUI, a selection of the first and second blocks containing the first input field and the second output field,
   construct the visual workflow using the first and second blocks, wherein the first and second blocks represent operations linking the first input field to the second output field; and
   execute the custom data connector to obtain a value for the first input field from the linked second output field.

6. The system of claim 5, wherein the first block and the second block are graphically rendered in the GUI as respective first and second shapes that are complimentary to each other and the user input selecting the blocks for the visual workflow comprises connecting the complimentary shapes of the blocks to each other.

7. The system of claim 2, wherein the one or more processors are further to present in the GUI:
   all visual workflows available for execution;
   computer agents in the cloud available to execute a visual workflow; and
   monitored data associated with any visual workflows that are in execution.

8. The system of claim 1, wherein each of the primitive coding blocks and the custom business blocks are associated with a unique identifier.

9. The system of claim 8, wherein the one or more processors are further to execute the translator based on the unique identifiers of the primitive coding blocks or the custom business blocks of the visual workflow, to generate the computer instructions for execution of the visual workflow by at least one of the computer agents in a software platform.

10. The system of claim 9, further comprising a computer agent pool from which to assign the at least one of the computer agents to access application programming interfaces (APIs) of the software platform to execute the visual workflow.

11. A method for implementing a customizable visual workflow for constructing custom data connectors that process data objects ingested from human resource (HR) data systems, the method comprising:
   identifying one or more data objects obtained from at least one of the HR data systems, wherein each of the data objects contains data fields storing HR information;
   presenting, in a graphical user interface (GUI), primitive coding blocks, wherein each of the primitive coding blocks is graphically represented by a corresponding geometric shape, and each of the primitive coding blocks represents a respective function that is provided in a standard library of a graphic programming environment;
   presenting, in the GUI, custom business blocks, wherein each of the custom business blocks is graphically represented by a corresponding geometric shape, each of the custom business blocks represents a respective high-level operation customly directed to the one or more data objects in operation with at least one of the HR data systems;
   constructing a visual workflow using at least one block selected, by a user using the GUI, from the primitive coding blocks and the custom business blocks, wherein selection, by the user using the GUI, from the primitive coding blocks and the custom business blocks is based on a complementary match of geometric shapes between two connected consecutive blocks, wherein the at least one block represents operations linking the data fields of the one or more data objects from the at least one HR data systems without further human programming coding to corresponding input fields of the at least one block;
   executing a translator to translate the at least one block of the visual workflow into a custom data connector comprising executable instructions; and
   executing the custom data connector to obtain values for the corresponding input fields of the at least one block from the linked data fields of the one or more data objects and generate, based on the values, at least one corresponding data object storing the HR information.

12. The method of claim 11, wherein the blocks are specified by extensible markup-language (XML) files that determine:
   data types for input fields and output fields of the blocks;
   computer instructions associated with the blocks; and
   graphical renditions for the blocks, wherein the shape of each block is complementary to the shape of other blocks that are compatible with the block for visual workflow programming.

13. The method of claim 12, further comprising:
   generating an extensible markup-language (XML) statement defining a storage call to the corresponding input fields of the at least one block with respect to the linked data fields of the one or more data objects, and
   serializing the visual workflow into XML based on the generated XML statement.

14. The method of claim 11, wherein the HR data systems comprise at least one secure file transfer protocol (SFTP) server, the one or more data objects comprise at least one comma-separated values (CSV) file, and the at least one corresponding data object comprises an XML file.

15. The method of claim 11, wherein a first one of the primitive coding blocks or the custom business blocks contains a first input field and a second one of the primitive coding blocks or the custom business blocks contains a second output field, the method further comprising:
   receiving, from the user through the GUI, a selection of the first and second blocks containing the first input field and the second output field,
   constructing the visual workflow using the first and second blocks, wherein the first and second blocks represent operations linking the first input field to the second output field; and executing the custom data connector to obtain a value for the first input field from the linked second output field.

16. The method of claim 15, wherein the first block and the second block are graphically rendered in the GUI as respective first and second shapes that are complimentary to each other and the user input selecting the blocks for the visual workflow comprises connecting the complimentary shapes of the blocks to each other.

17. The method of claim 12, further comprising presenting in the GUI:
- all visual workflows available for execution;
- computer agents in the cloud available to execute a visual workflow; and
- monitored data associated with any visual workflows that are in execution.

18. The method of claim 11, wherein each of the primitive coding blocks and the custom business blocks are associated with a unique identifier.

19. The method of claim 18, further comprising executing the translator based on the unique identifiers of the primitive coding blocks or the custom business blocks of the visual workflow, to generate the computer instructions for execution of the visual workflow by at least one of the computer agents in a software platform.

20. The method of claim 19, further comprising assigning the at least one of the computer agents to access application programming interfaces (APIs) of the software platform to execute the visual workflow from a computer agent pool.

* * * * *